Dec. 11, 1923.

C. F. RANDOLPH 1,477,186

LATHE TOOL CARRIAGE

Filed July 6, 1920

Inventor
Clifford F. Randolph
By S. Jay Teller
Attorney

Dec. 11, 1923. 1,477,186
C. F. RANDOLPH
LATHE TOOL CARRIAGE
Filed July 6, 1920 2 Sheets-Sheet 2
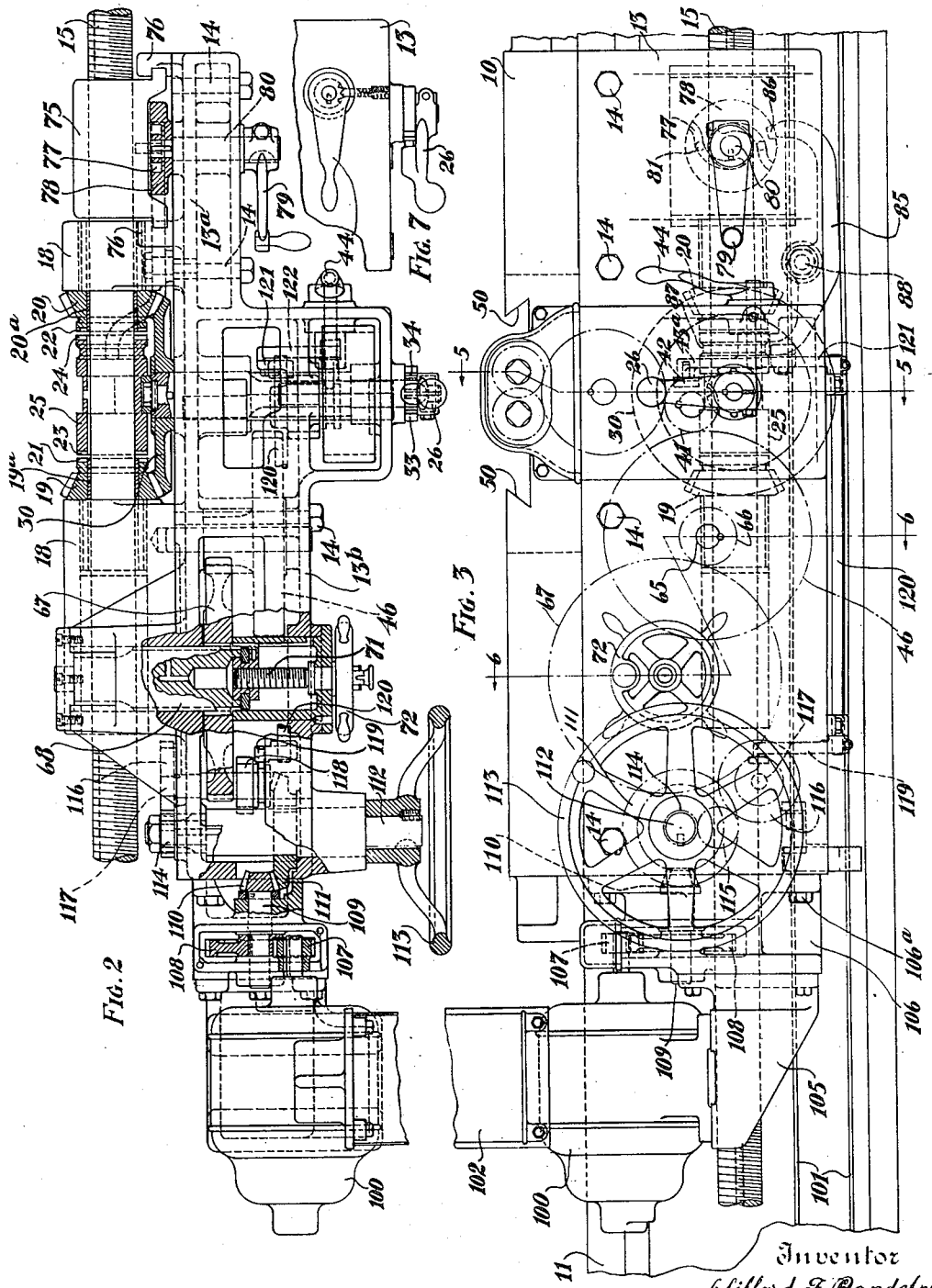

Patented Dec. 11, 1923.

1,477,186

UNITED STATES PATENT OFFICE.

CLIFFORD F. RANDOLPH, OF PLAINFIELD, NEW JERSEY, ASSIGNOR TO NILES-BEMENT-POND COMPANY, OF NEW YORK, N. Y., A CORPORATION OF NEW JERSEY.

LATHE-TOOL CARRIAGE.

Application filed July 6, 1920. Serial No. 394,198.

*To all whom it may concern:*

Be it known that I, CLIFFORD F. RANDOLPH, a citizen of the United States, residing at Plainfield, in the county of Union and State of New Jersey, have invented certain new and useful Improvements in Lathe-Tool Carriages, of which the following is a specification.

This invention relates to lathe tool carriages and in particular to a tool carriage for larger sizes of lathes having a rapid traverse motor mounted on the carriage in addition to driving means for operating the carriage laterally in either direction during the cutting operation.

One of the objects of the invention is to provide a compact arrangement of driving means on a lathe tool carriage to move the carriage laterally during the cutting operation and including a motor for obtaining a rapid lateral traverse.

Another object of the invention is to provide a rigid box-like frame forming the lathe apron and in which the driving connections for the carriage may be enclosed.

Another object of the invention is to provide an extension on one side of the carriage and a bracket supported on the extension on which a motor to operate the rapid traverse of the carriage is adapted to be fitted, the speed reducing means therefor being housed within the extension member.

Another object of the invention is to provide an extension and bracket for the motor drive which may be detachably attached to the apron so that should it be desired to construct a lathe carriage without this additional motor traverse, the apron construction would not require redesigning or, if the motor traverse should be desired at any time it could be added by simply attaching the above named parts at one end of the apron.

An additional object of the invention is to provide a simple controlling means to render the motor traverse mechanism effective or ineffective as desired.

With these and other objects in view my invention consists in the features of construction and operation set forth in the following specification. In the accompanying drawings I have shown the embodiment of the invention which I now deem preferable but it is to be understood that changes and modifications may be made within the scope of the appended claims without departing from the spirit of the invention.

Referring to the drawings:

Fig. 2 is a plan view of the lathe apron provided on the tool carriage, parts being broken away to more clearly show this construction.

Fig. 3 is a front elevation of the lathe carriage and apron with the cross slide removed.

Fig. 7 is a detail view of a part of the apron and two of the controlling levers.

Figure 1:
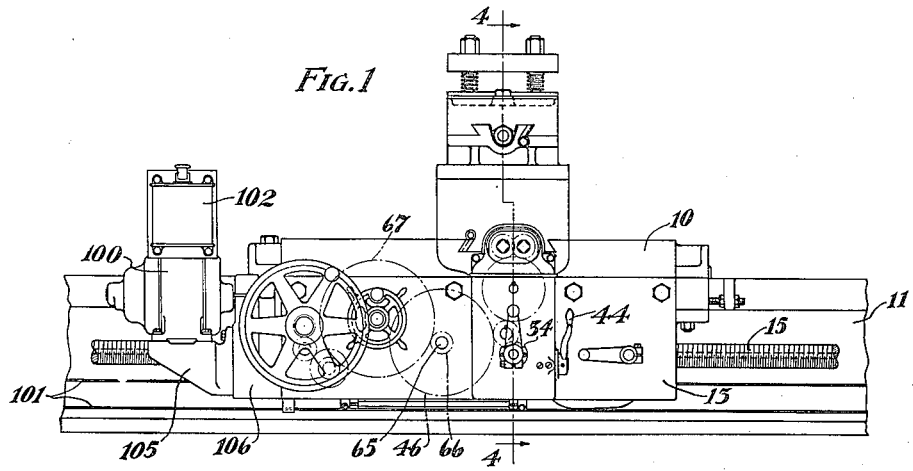
Figure 1 is a front elevation of the tool carriage and a part of the lathe bed.
Figure 4:
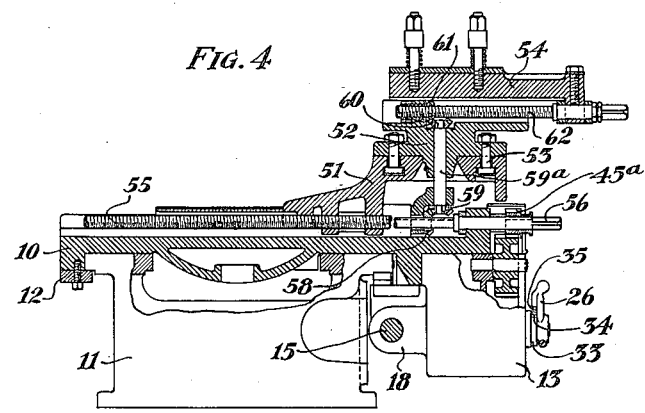
Fig. 4 is an elevation in cross section taken on the line 4—4 of Fig. 1 looking in the direction of the arrows.

As illustrated in the above mentioned drawings, the embodiment of the invention selected for illustration comprises the following principal parts: first, a lathe tool carriage having the usual arrangement of driving connections between a suitable splined and screw threaded shaft lying adjacent the tool carriage and a rack mounted longitudinally on the lathe bed; second, a rapid traverse motor conveniently mounted on a suitable bracket provided at one end of the carriage; third, speed reducing means between the motor and carriage driving means mounted adjacent the motor in an extension provided on the carriage adjacent the motor supporting means; fourth, manual means to traverse the carriage; fifth, a means to disconnect the motor traverse means during the cutting operation, and sixth, a rigid form of lathe carriage apron to enclose a part of the above described mechanism.

Referring more particularly to the figures of the drawing, a tool carriage as a whole is shown at 10. This rests in the usual way upon guideways provided on the upper surface of the lathe bed 11 and is suitably gibbed thereto by locking strips or plates 12 so that the carriage may slide laterally along the lathe bed without undue friction.

Depending from the forward side of the carriage 10 is a lathe apron 13 suitably fastened to the tool carriage 10 by bolts 14. It is upon this apron 13 and enclosed within its rear and front walls 13ª and 13ᵇ respectively that the mechanism forming the basis of the present invention is mounted. As usual in this type of lathe, there is a splined shaft 15 provided extending along the bed 11 of the lathe adjacent the apron 13 and I may also provide the lathe with a lead screw adjacent the splined shaft, but in the embodiment of the invention selected for illustration the screw threads 16 are provided on the same shaft so that this shaft 15 acts to move the tool carriage laterally during the usual cutting operation and also while a screw thread is being formed. Directly under the forward edge of the lathe bed is a rack 17 by means of which the power derived from the rotation of the shaft 15 is utilized to feed the carriage laterally while the lathe is cutting.

The lathe apron 13 has on its rear wall 13ª a pair of outstanding aligned lugs preferably made integral therewith and suitably bored to permit the passage therethrough of the splined and screw-threaded shaft 15. Suitable bearings are provided on these lugs for this shaft as shown in Fig. 2. Located between the lugs 18 and surrounding the shaft 15 are oppositely disposed bevel gears 19 and 20 free to slide along and rotate upon the shaft 15. If desired and as shown in Fig. 2, suitable bearings 19ª and 20ª may be provided for gears 19 and 20 extending into the lugs 18 and forming bearings away from the shaft 15 for these gears. These bevel gears 19 and 20, as shown in Fig. 2, have their toothed faces facing toward each other. Each of these gears 19 and 20 is provided on its inner face with clutch teeth as shown respectively at 21 and 22 adapted to mesh respectively with corresponding clutch teeth 23 and 24 provided on the opposite ends of a clutch member 25. Clutch member 25 is splined to the shaft 15 by means of key or feather 25ª secured within the clutch member 25 and sliding along the spline provided in shaft 15. As shown in Fig. 2, the clutch member is in its neutral position. To move the clutch member 25 in either direction so that it will engage with the clutch teeth 21 or 22 on either bevel gear 19 and 20, a lever 26 is provided, most clearly shown in Fig. 5. The lever 26 which provides a convenient handle for controlling the position of the clutch member 25 is mounted on and fastened to the forward end of a short rod 27 which extends rearward and at its rear end carries an eccentrically mounted stud 28. Oscillation of the lever 26 moves the stud 28 to the right or left and, through movement of the stud 28 and a yoke member 29 which fits into a central circumferential groove on the clutch member 25, forces the clutch member 25 laterally in either direction so that either bevel gear 19 or 20 may be caused to rotate with the clutch member 25 and the shaft 15 dependent upon the direction in which the lever 26 is moved.

Figure 5:
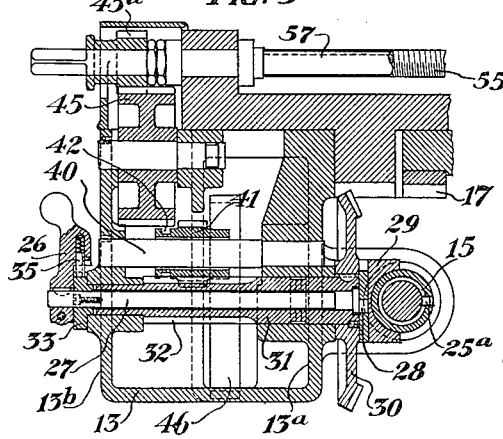
Fig. 5 is an elevation in cross section taken on the line 5—5 of Fig. 3 looking in the direction of the arrows.

In mesh with both bevel gears 19 and 20 is a bevel gear 30 mounted on and fastened to the rear end of a sleeve 31. Sleeve 31 extends forward from the gear 30 and is rotatably mounted in suitable bearings provided in the rear wall 13ª and front wall 13ᵇ of the apron 13. As shown in Fig. 5 this sleeve 31 surrounds and forms a bearing for the operating rod 27 previously mentioned. Along the sleeve 31 are provided integral gear teeth 32 thus forming a driving pinion for the lateral and cross feed mechanism presently to be described. As shown in this figure, I preferably form the gear teeth 32 so that their outer diameter is no larger than the remaining portion of the sleeve so that this sleeve may be easily put in its operative position in the apron 13.

From the above it will be seen that by operating the lever 26 in either direction from the central or neutral position shown in the figures the bevel gear 30, and consequently the sleeve pinion 32, may be rotated in either direction. Preferably I fasten the small plate 33 to the forward wall of the apron 13 surrounding the operating rod 27 and fitting the orifice in the apron 13 through which the sleeve 31 extends. This plate 33 is provided with notches 34 into which may fit a spring pressed plunger 35 mounted on the lever 26 to hold the lever 26 in one of its adjusted positions.

Mounted in suitable bearings in the front and rear walls of the apron 13 is a short shaft 40 on which is slidably and rotatably mounted a gear 41. Gear 41 is provided with a circumferential groove 42 in which fits a small shoe 43 pivoted on the end of a control lever 43ª which may be operated by a hand lever 44. Gear 41 has three positions along the shaft 40; first, a forward position in which it meshes with a gear 45 suitably mounted in the apron 13 to operate the cross feed; second, a central or neutral position as shown in Fig. 5; and third, a rear position in which it is in mesh with the gear 46 to operate the lateral feed movements of the carriage presently to be described.

The cross feed will first be described. Mounted to move forward and back in a dovetailed guideway 50 is a tool mounting or slide 51 which, on its upper surface has a compound rest 52, rotatably mounted thereon and adapted to be clamped to the slide 51 in any adjustable angular position by suitable clamping bolts 53. The compound rest or turn table 52 carries a tool slide 54 adapted to slide relative to the rest 52 in suitable guideways. A tool may be mounted in slide 54 in any convenient manner.

To move the cross slide 51, a screw 55 is provided rotatably secured near one end of the carriage 10. This screw 55 is threaded into the cross slide 51 so that rotation of the screw 55 either manually by a wrench on the squared end 56 of the screw 55 or, by power, from gear 41 through gear 45 to a pinion 45<sup>a</sup> non-rotatably secured to the screw 55 moves the slide 51.

In the modification illustrated, I also provide means for advancing and withdrawing the tool slide 54 either manually or by power. Lying adjacent the screw 55 is a splined shaft 57 which carries a bevel pinion 58 meshing with another bevel pinion 59 fastened on the lower end of a vertical shaft 59<sup>a</sup>. Another bevel gear 60 is fastened to the upper end of shaft 59<sup>a</sup> and is in mesh with a bevel pinion 61 on a screw 62 extending within guideways in the rest 52 and rotatably fastened at the forward end of the tool slide 54. Screw 62 serves to move the tool slide 54 relative to the rest 52. The forward end of the screw 62 is squared for holding a suitable wrench for manual adjustment of this angular tool slide 54. Shaft 59<sup>a</sup> is so positioned that its axis lies in alignment with the axis about which the rest 52 may swivel. As but one of the screws 55 or 62 can be operated at one time, I have found it convenient to provide but one pinion 45<sup>a</sup> adapted to fit in place on either the screw 55 or the splined shaft 57.

From the above description it will be seen that mechanism has been provided to operate the cross feed by power by placing the sliding gear 41 in mesh with the gear 45. The direction of movement of the cross feed when thus operated by power is controlled by lever 26 which rotates the sleeve 31 in either direction dependent upon the position of the clutch member 25.

The lateral or left and right traverse of the carriage 10 is also derived from the rotation of sleeve 31 as above indicated. With the pinion 41 in its rearmost position it is in mesh with the gear 46. Gear 46 is mounted on a short shaft 65 to which is also fastened a pinion 66. Pinion 66 is in mesh with a gear 67 mounted on shaft 68 extending rearwardly through the apron 13. Shaft 68 is adapted to slide forward and back within the apron 13 and for that purpose shaft 68 carries at its forward end a plate 69 (see Fig. 6), rotatably mounted in its forward end, which, in turn in non-rotatably mounted by being splined to a bushing 70 fastened in place in the apron 13.

Figure 6:
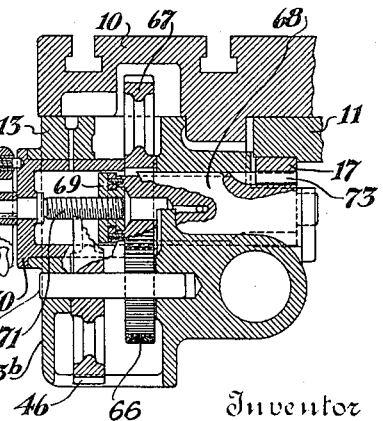
Fig. 6 is an elevation in cross section taken on the line 6—6 of Fig. 3 looking in the direction of the arrows.

To move the shaft 68 a screw 71 is provided threaded into plate 69 and having a handle 72 in the form of a hand wheel extending to a position forward of the apron 13. Rotation of hand wheel 72 thus serves to move the shaft 68 forward and back, thus maintaining a sliding but non-rotatable connection with the gear 67. On its rearward end, as shown in Fig. 6, the shaft 68 is provided with gear teeth 73 which, in the position shown in this figure, are in mesh with the rack 17. Movement of the shaft 68 to its forward position disengages the gear teeth 73 from the rack 17.

From the above it will be seen that with the gear teeth 73 on member 68 engaging the rack 17 which, as above stated is fastened to the lathe bed 11 lateral movement of the carriage 10 may be imparted from the splined shaft 15 through the gearing above described. This movement of the carriage occurs only when the shaft 68 is in its rearward position and clutch member 25 is in one of its operative positions.

For screw cutting the usual split nut construction is utilized; this comprises a pair of members 75 one of which is shown in Fig. 2. Each of these members has screw threads on one of its surfaces embracing one half of the lead screw and splined shaft 15. Members 75 are slidably mounted in suitable guideways 76 and are forced toward or away from the lead screw 15 by cam slots 77 in cam plate 78. Rotation of cam plate 78 is accomplished by handle 79 mounted on a short shaft 80. Rotation of handle 79 and cam plate 78 forces the members 75 toward or away from each other by means of suitable pins 81 secured in the members 75 and engaging the cam slots 77.

To prevent the simultaneous engagement of the screw threading members 75 and the clutch 25 a rock lever 85 is provided, one end of which may engage a notch 86 in cam plate 78 and the other end engage a circumferential groove 87 in the clutch member 25. Movement of the clutch member 25 tilts the rock lever 85 about pivot 88 so that its opposite end engages the notch 86. Notch 86 is so placed that it may be engaged by lever 85 only when the members 75 are in their inoperative position and clutch member 25 may not be thrown into either of its operative positions except when the members 75 are in their outermost or inoperative position. Similarly, when clutch member 25 is in one of its operative positions rock shaft 85 is in engagement with notch 86 and the members 75 can not be thrown into engagement with the shaft 15.

To permit the carriage 10 to be rapidly positioned along the lathe bed I provide a traversing means independent of the driving shaft 15. For this purpose I mount a motor 100 on a part of the carriage 10. Extending along the lathe bed 11 are wires 101 connected to any suitable source of electric current from which the motor 100 may be operated. A controller 102 is also provided which may be mounted directly above or conveniently near the motor 100, as shown, by means of which the speed and direction of the motor 100 may be controlled.

Motor 100 is supported on a bracket 105 fastened to the outer side of an extension 106 fastened to one end of the carriage 10. The driving connections for motor 100 are clearly shown in Figs. 2 and 3; these comprise a pinion 107 mounted on the armature shaft and in mesh with a gear 108 on a shaft 109 having at one end a bevel pinion 110 meshing with bevel gear 111. For convenience shaft 112 on which gear 111 is mounted is provided at its forward end with a hand wheel 113 by means of which the position of the carriage 10 may be manually adjusted.

Preferably the extension 106 is detachably fastened to the apron by bolts or screws 106ª. This permits the extension 106 and bracket 105 to be easily disassembled or to be omitted without interference with the design of the other parts of the carriage.

At the rear end of the shaft 112 is provided a gear 114 meshing with another gear 115 directly below it. Gear 115 is in mesh with gear 116 on a shaft 117. On shaft 117 is a sliding gear 118 splined thereto and adapted to be moved along shaft 117 by means of a lever 119 on a rod 120 extending horizontally along the carriage 10 and having a lever 121 connected to its opposite end. Lever 121 is connected by reach arm 122 to lever 43ª preferably to an extension to the lever and operated therewith by handle lever 44.

With the lever 44 in its forward position the gears 118 and 67 will be in mesh thus permitting the motor 100 to move the carriage 10 at a relatively high rate of speed, while in the position as shown in Fig. 2 the motor 100 will be disconnected and the carriage 10 may be operated through the usual carriage feed drive.

The control of the driving connection for the motor 100 by the handle lever 44 automatically prevents the carriage feed and motor traverse being simultaneously connected. With the handle lever 44 in its rearward position pinion 41 is in mesh with gear 46 so that the carriage 10 is operated through the clutch drive from the bevel gear 30 and the gear 118 is in its inoperative position. With the handle lever 44 in its forward position the gears 41 and 46 are out of mesh and the gears 67 and 118 are in mesh. The forward position of handle lever 44 is the cross feed position for this lever in which the gear 41 meshes with gear 43, the cross feed, however, may easily be disconnected by removal of pinion 45ª from the cross feed screw 55.

What I claim is:

1. Motor driving means for a lathe tool carriage comprising in combination, a carriage, an extension therefore, a bracket attached to said extension, a motor mounted on said bracket, motor driving means in said carriage and extension including speed reducing means between said motor and carriage, and means to disconnect said motor from a part of said speed reducing means.

2. Motor driving means for a lathe tool carriage comprising in combination, a carriage, an extension therefor, a bracket attached to said extension, a motor mounted on said bracket, motor driving means in said carriage and extension including speed reducing means between said motor and carriage, and a sliding gear to disconnect said motor from a part of said speed reducing means.

3. Motor driving means for a lathe tool carriage comprising in combination, a carriage, an extension therefor, a bracket attached to said extension, a motor mounted on said bracket, supply wires for said motor extending adjacent said carriage, speed reducing means for said motor mounted in said extension, and means to detachably couple said speed reducing means to carriage feed mechanism.

4. Motor driving means for a lathe tool carriage comprising in combination, a carriage, an extension therefor, a bracket attached to said extension, a motor mounted on said bracket, controlling means for said motor also mounted on said bracket, speed reducing means for said motor in said extension, and means to detachably couple said speed reducing means to carriage feed mechanism.

5. Motor driving means for a lathe tool carriage comprising in combination, a carriage, an extension therefor, a bracket attached to said extension, a motor mounted on said bracket, controlling means for said motor also mounted on said bracket, supply wires for said motor extending adjacent said carriage, speed reducing means for said motor in said extension, and means to detachably couple said speed reducing means to carriage feed mechanism.

6. Motor driving means for a lathe tool carriage comprising in combination, a carriage, an extension therefor, a bracket attached to said extension, a motor mounted on said bracket, controlling means for said motor also mounted on said bracket, and speed reducing means for said motor in said extension, said speed reducing means being detachably coupled to said carriage feeding means mounted in said carriage.

7. Motor driving means for a lathe tool carriage comprising in combination, a carriage, an extension therefor, a bracket attached to said extension, a motor mounted on said bracket, controlling means for said motor also mounted on said bracket, supply wires for said motor extending adjacent said carriage and speed reducing means for said motor in said extension, said speed reducing means being detachably coupled to said carriage feeding means mounted in said carriage.

8. A lathe tool carriage comprising in combination a frame, an apron depending therefrom, driving mechanism for longitudinally advancing said carriage enclosed in said apron and adapted to engage a driving shaft lying adjacent thereto, an extension mounted at one end of said carriage, speed reducing gearing therein, a bracket mounted on said extension and a motor on said bracket operatively connected with said speed reducing gears and connected to said driving gears, and a sliding gear to disconnect said motor from said speed reducing means.

9. A lathe tool carriage comprising in combination, an apron, said apron comprising a box-like frame having integrally formed front and rear walls, and driving means for moving said carriage laterally and for moving a tool slide forward and back contained within the space between said front and rear walls, and an independent driving means mounted at one end of said apron to laterally move said carriage.

10. A lathe tool carriage comprising in combination, an apron, said apron containing driving connections operated by a rotating shaft to move said carriage laterally, and an independent motor driving means detachably attached to said apron and having driving connections with said carriage, whereby said carriage may be moved laterally independently of said rotating shaft.

11. A lathe tool carriage comprising in combination, an apron, said apron containing driving connections operated by a rotating shaft to move said carriage laterally, and an independent motor driving means detachably attached to said apron on one of its vertical end surfaces and having driving connections with said carriage, whereby said carriage may be moved laterally independently of said rotating shaft.

12. A lathe tool carriage comprising in combination, an apron, said apron containing driving connections operated by a rotating shaft to move said carriage laterally, an extension detachably attached to one end of said apron, a motor mounted adjacent said extension and driving connections for said motor contained within said extension and joining the driving connections in the apron, whereby an independent means is provided for moving said carriage.

13. A lathe tool carriage comprising in combination, an apron, said apron containing driving connections to move said carriage laterally, an extension detachably attached to one end of said apron, a bracket mounted on said extension, a carriage driving motor mounted on said bracket and driving connections in said extension and apron for moving said carriage by said motor.

14. A lathe tool carriage comprising in combination, an apron, driving means on said apron for driving said carriage laterally in either direction, means connecting said driving means to a driving shaft lying adjacent said carriage, an independent driving means comprising a motor, and means connecting said motor to said first mentioned driving means, whereby said carriage may be moved laterally at a high or low speed.

15. A lathe tool carriage comprising in combination, a frame, an apron depending therefrom, driving mechanism for longitudinally advancing said carriage enclosed therein and adapted to engage a driving shaft lying adjacent thereto, an extension mounted at one end of said carriage, speed reducing gearing therein, a bracket mounted on said extension and a motor on said bracket operatively connected with said speed reducing gears and connected to said driving gears.

16. A lathe tool carriage comprising in combination, an apron, driving means on said apron for driving said carriage laterally in either direction, means connecting said driving means to a driving shaft lying adjacent said carriage, an independent driving means comprising a motor mounted on a bracket at one end of said carriage, and means connecting said motor to said first mentioned driving means, whereby said carriage may be moved laterally at a high or low speed.

17. A lathe tool carriage comprising in combination, an apron, driving means on said apron for driving said carriage laterally in either direction, means connecting said driving means to a driving shaft lying adjacent said carriage, an independent driving means comprising a motor, mounted at one end of said carriage, supply wires for said motor mounted adjacent said carriage, and means connecting said motor to said first mentioned driving means, whereby said carriage may be moved laterally at a high or low speed.

18. A lathe tool carriage comprising in combination, feed traversing means, rapid traversing means comprising a motor mounted on said carriage, and a single lever to operate said carriage from said feed traversing means or from said motor mounted on said carriage.

19. A lathe tool carriage comprising in combination, feed traversing means, driving connections from a feed shaft therefor, rapid traversing means comprising a motor mounted on said carriage, and a single lever mounted on said carriage to operate said carriage from said feed traversing means or from said motor mounted on said carriage.

20. A lathe tool carriage comprising in combination, an apron having driving connections to laterally move said carriage either from a rotating shaft lying adjacent said carriage or from a motor mounted on said carriage, and a single lever to control the operation of said carriage from said rotating shaft or from said motor.

21. A lathe tool carriage comprising in combination, an apron, driving connections on said apron to feed said carriage laterally and transversely, independent means comprising a motor mounted on said carriage to operate said carriage laterally, a lever to control the feeding means for said carriage, movement of said lever into one of its operative positions serving to control said independent means.

In testimony whereof, I heretofore affix my signature.

CLIFFORD F. RANDOLPH.